(12) United States Patent
Zwall et al.

(10) Patent No.: US 8,879,392 B2
(45) Date of Patent: Nov. 4, 2014

(54) BGP SECURITY UPDATE INTERCEPTS

(75) Inventors: Jeffrey V. Zwall, Oak Point, TX (US); Alvaro E. Retana, Raleigh, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 244 days.

(21) Appl. No.: 13/456,715

(22) Filed: Apr. 26, 2012

(65) Prior Publication Data
US 2013/0286831 A1    Oct. 31, 2013

(51) Int. Cl.
| G01R 31/08 | (2006.01) |
| G06F 11/00 | (2006.01) |
| H04L 12/715 | (2013.01) |
| H04L 29/06 | (2006.01) |

(52) U.S. Cl.
CPC .............. *H04L 45/04* (2013.01); *H04L 63/123* (2013.01)
USPC ........................................................ 370/235

(58) Field of Classification Search
CPC ........................................................ H04L 45/04
USPC ........................................................ 370/241
See application file for complete search history.

(56) References Cited

U.S. PATENT DOCUMENTS

| 7,551,627 | B2 | 6/2009 | Scholl | |
| 7,804,839 | B2 | 9/2010 | Purvis et al. | |
| 8,068,408 | B2 | 11/2011 | Ansari et al. | |
| 2005/0105522 | A1* | 5/2005 | Bakshi et al. | 370/389 |
| 2007/0016767 | A1 | 1/2007 | Banda et al. | |
| 2009/0129380 | A1* | 5/2009 | Paul et al. | 370/389 |
| 2011/0188373 | A1* | 8/2011 | Saito | 370/230 |

FOREIGN PATENT DOCUMENTS

WO    WO2007062559    6/2007

OTHER PUBLICATIONS

Reynolds, et al., "Using External Security Monitors to Secure BGP," Cornell University, Apr. 2007, 15 pages.*
Lepinski, et al., "An Overview of BGPSEC," BBN Technologies, IECA, Mar. 7, 2011, 7 pages.
Verkaik, et al., "Wrestling Control from BGP: Scalable Fine-grained Route Control," UCSD/AT&T Research, Usenix, Jun. 22, 2007, 14 pages.

* cited by examiner

*Primary Examiner* — Mark Rinehart
*Assistant Examiner* — Maharishi Khirodhar

(57) ABSTRACT

Network devices, systems, and methods, including executable instructions and/or logic thereon, are provided to perform BGP intercepts. A network device includes a processing resource coupled to a memory. The memory includes program instructions executed by the processing resource to intercept BGP updates and process associated cryptographic signatures before receipt by a BGP router.

15 Claims, 3 Drawing Sheets

BGP SECURITY UPDATE INTERCEPTS

BACKGROUND

Computing networks can include multiple network devices including network devices such as routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

For next generation networks, Border Gateway Protocol (BGP) Security (BGPsec) has been proposed (by the Internet Engineering Task Force (IETF)) which assumes additional capabilities in routers. The current design of BPGsec requests that each BGP update be forward signed as the update traverses the Internet. In particular, BGPsec draft standards, currently under development, propose adding digital signatures to BGP update messages. As such, an Autonomous System (AS) that wishes to receive BGPsec update messages will involve providing additional memory in its routers, e.g., in Adjacent Router Information Bases (ADJ-RIBs), to store the data conveyed in these large update messages.

Additionally, the design of BGPsec assumes that an AS that elects to receive BGPsec update messages will do some cryptographic signature verification at its edge router, e.g., BGP router. This is one example that would involve additional capability on the edge router. Unfortunately, such additional capabilities involve cost and time to update legacy hardware in existing networks.

DETAILED DESCRIPTION

Figure 1:
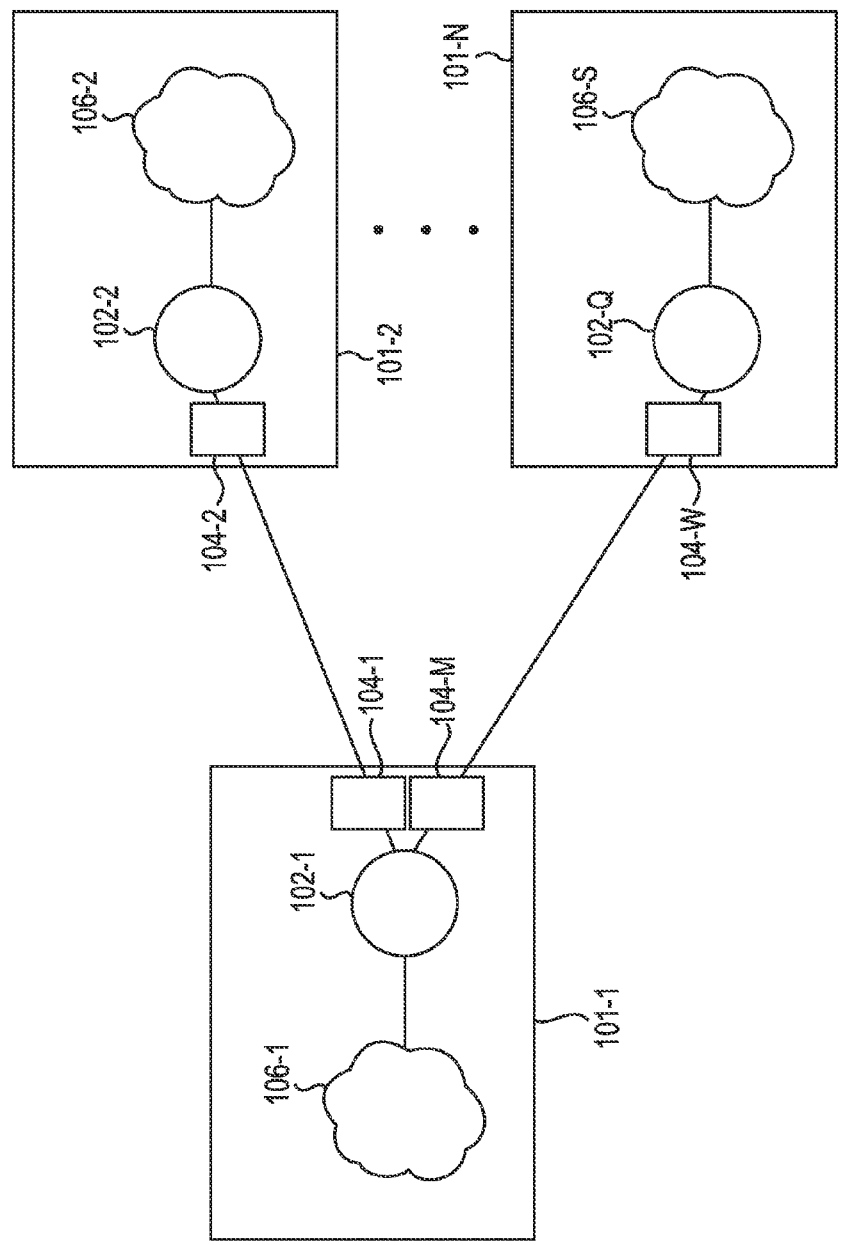
FIG. 1 illustrates a number of Autonomous Systems connected together as suitable to implement embodiments of the present disclosure.

Embodiments of the present disclosure may include network devices, systems, and methods, including executable instructions and/or logic thereon, to perform BGP intercepts. A network device includes a processing resource coupled to a memory. The memory includes program instructions executed by the processing resource to intercept BGP updates and process associated cryptographic signatures before receipt by a BGP router In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. The designators "N", "M", "Q", "S", and "W", for example, particularly with respect to feature numerals in the drawings, can indicate that a number of the particular feature so designated can be included with examples of the present disclosure. The designators can represent the same of different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1B, and a similar element may be referenced as 208 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a number of Autonomous Systems (ASes) connected together as suitable to implement embodiments of the present disclosure. As used herein an Autonomous System (AS) is a portion of a network presumed to be under the control of one entity and/or administrative function. In FIG. 1 a number of autonomous systems (ASes), e.g., 101-1, 101-2, . . . , 101-N, are connected together and communicatively exchanging packets, e.g., routing information. Routing paths follow Internet Protocol (IP) and utilize both control planes and data planes for exchanging packets. The control plane exchanges information between network devices for governing the protocols and the paths, e.g., routes, that packets will take through a network. The data plane handles the policies, actions, and operations, e.g., forwarding, authorization, ACL look ups, filtering, etc., performed on the packets content, e.g., data or payloads, as the packets move through the network.

As shown in FIG. 1, each AS includes at least one edge router, e.g., 102-1, 102-2, . . . 102-Q, (e.g., a Border Gateway Protocol (BGP) router) for exchanging packets with other ASes. Although only a single edge router, e.g., 102-1, 102-2, . . . , 102-Q, is shown in each AS 101-1, 101-2, . . . , 101-N, numerous edge routers may be employed in a given AS. The edge routers 102-1, 102-2, . . . , 102-Q are connected to other network fabric, computing devices, storage devices and/or hosts, etc., 106-1, 106-2, . . . , 106-S, within a given AS 101-1, 101-2, . . . , 101-N.

In FIG. 1, a number of additional network devices 104-1, 104-2, . . . , 104-M, 104-W, according to embodiments described herein, are inserted into the paths connecting the message and information exchange of packets between collections of AS networks 101-1, 101-2, . . . , 101-N. In at least one embodiment, each additional network device 104-1, 104-2, . . . , 104-M, 104-W logically belongs to one of the ASes 101-1, 101-2, . . . , 101-N. In some embodiments the additional network device is configured to intercept packet traffic in one direction, e.g., toward the AS in which a recipient network device (102-1, 102-2, . . . , 102-Q) is located.

According to some embodiments of the present disclosure, a number of additional network devices 104-1, . . . , 104M are inserted to intercept BGP control plane information. The network devices, e.g. 104-1, 104-2, . . . , 104-M, 104-W, have access to processing and memory resources. The embodiment of FIG. 1, illustrates the number of network devices 104-1, . . . , 104M as stand-alone devices, e.g., boxes, physically positioned in the path, e.g., in front of the edge routers 102-1, 102-2, . . . , 102-Q. However, embodiments are not so limited to this example, and the network devices may alternatively or additionally be remotely located in a distributed computing environment. In at least one embodiment, a network device described herein, e.g., 104-1, 104-2, . . . , 104-M, 104-W, is an embedded card in an edge router, e.g., 102-1, 102-2, . . . , 102-Q.

Border Gateway Protocol (BGP) is a current protocol routers use to announce, propagate, and withdraw routes between ASes in the Internet. Border Gateway Protocol Security (BGPsec) is an extension to the BGP standard (draft standards currently under development) that seeks to provide improved security for BGP routing. One motivation for developing BGPsec is that BGP does not include mechanisms that allow an AS to verify the legitimacy and authenticity of BGP route advertisements. Route advertisements communicate routes (which may be stored in a Route Information Base (RIB)), between edge routers to ASes, e.g., BGP "speaker" routers. A "BGP speaker" router is a router that participates in BGP at the edge of an AS.

The absence of mechanisms for a router to verify the legitimacy and authenticity of BGP route advertisements and the correct operation of other routers creates opportunities for attacks on networks. As proposed in BPGsec the Resource Public Key Infrastructure (RPKI) provides a first step towards addressing the validation of BGP routing data through the use of cryptographic keys and digital signatures. Unfortunately, as mentioned above, implementation of BGPsec presumes upgrades to legacy routers in existing networks. However, upgrades to legacy routers may involve time, cost, and disruption to data traffic in AS networks. Previous proposals have suggested the inclusion and connection of network devices, e.g., security appliances, intrusion detection systems (IDS), NATs, etc., to intercept information before it reaches a given network device, e.g., router. Existing security applications have tended to focus on data plane processing or specific security applications, e.g., TCP interceptors, firewalls/NAT, load balancers and other flow management devices, WAN acceleration, etc. Some approaches focus on providing a separate controller to which major routing functions are offloaded. However, this approach may also involve significant costs and upgrades to legacy network infrastructures. In yet another approach external security monitors, to manage and monitor control plane processing, have been proposed which involve additional configuration within and between communicating network devices, e.g., BGP routers.

By contrast, embodiments of the present disclosure provide networks devices, either in stand-alone or as embedded card configurations, and methods in the form of computer executable instruction, e.g., program instructions, that can intercept and operate on network traffic in a manner that is transparent to the communicating network devices. That is, the communicating network devices are not and do not have to be aware the embodiments are present. As such, whether the network devices embodiments or other communicating network devices go down, there does not have to be a reconfiguration of the communication devices, e.g., BGP speakers, or disruption in service to an AS network. In at least one embodiment discussed further in connection with FIG. 2, program instructions are executed to intercept control plane messages and verify cryptographic signatures associated with a BGP update before receipt by a BGP router. The program instructions are further executed to propagate the BGP update, unchanged, but tagged to the BGP router. In this manner, no additional memory resources or reconfiguration of a legacy BGP router will be involved with implementing cryptographic signatures to BGP routing protocol, e.g., to implement the BGPsec draft standards currently under development.

Figure 2:
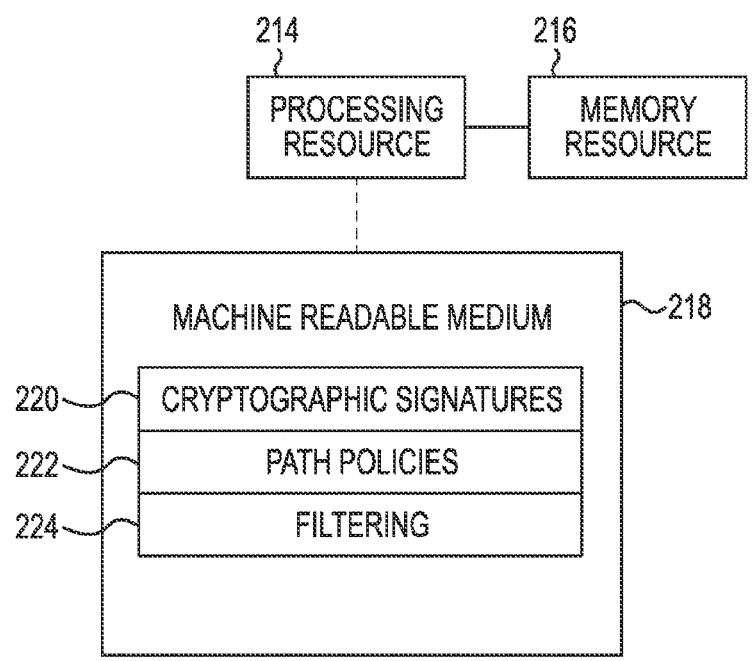
FIG. 2 is a block diagram illustrating a processing resource, a memory resource, and a machine readable medium according to the present disclosure.

FIG. 2 is a block diagram illustrating a processing resource 214, a memory resource 216, and a non-transitory, machine readable medium 218, including modules having computer executable instructions stored thereon that can be executed to perform particular acts and functions, according to the present disclosure. The processing resource 214 and the memory resource 216 can be local to a network device such as a network security platform, a network controller, or another network device. The machine readable medium 218 and/or the memory resource 216 store program embodiments (e.g., software, firmware, etc.) executable by the processing resource 214. The machine readable medium can be local to the network device or remote therefrom. For those examples in which the machine readable medium is remote from the network device, the instructions can be loaded into the memory resource 216 of the network device.

As used herein, a processing resource 214 can include one or a plurality of processors such as in a parallel processing system. A memory resource 216 can include memory addressable by the processing resource 214 for execution of machine readable instructions 218, e.g., program instructions. The memory resource 216 can include volatile and/or non-volatile memory such as random access memory (RAM), static random access memory (SRAM), electronically erasable programmable read-only memory (EEPROM), magnetic memory such as a hard disk, floppy disk, and/or tape memory, a solid state drive (SSD), flash memory, phase change memory, etc.

As shown in FIG. 2, the machine readable medium 218 can include a cryptographic signatures module 220 including a particular set of instructions that are executed by the processing resource 216 to intercept control plane messages to an edge router, e.g., 102-1, 102-2, . . . , 102-Q in FIG. 1, and verify cryptographic signatures associated with a BGP update before receipt by a BGP router. The instructions 220 can further executed to propagate the BGP update, unchanged, but tagged to the BGP router. In one or more embodiments, the instructions are executed to intercept BGP updates and process associated cryptographic signatures in a manner that is transparent to the network devices communicating and exchanging the control plane messages. That is, the instructions 220 are executed such that the communicating network devices are not and do not have to be aware the instruction embodiments 220 are present and being executed. For any given peering session between two (2) BGP speakers, e.g., 102-1 and 102-2, there can be two (2) network devices, according to the present embodiments (e.g., BGP interceptors 104-1 and 104-2), one in each AS, e.g., 101-1 and 101-2.

As such, whether a network device executing the instructions embodiments 220 or other communicating network device goes down, there does not have to be a reconfiguration or disruption in service. Further, no additional memory resources or reconfiguration of a legacy BGP router will be involved with implementing cryptographic signatures to BGP routing protocol, e.g., to implement the BGPsec draft standards currently under development.

As shown in FIG. 1, one example for executing the instructions 220 in a manner transparent to the network devices communicating and exchanging the control plane messages includes physically positioning a device that executes the instructions directly in the control plane connection path in front of the recipient network device. This approach provides for easy network implementation and deployment and would work with third party, legacy routers.

As shown in FIG. 2, however, the program instructions may stand entirely separate and be remotely located from the a given network device, e.g., edge routers 102-1, 102-2, . . . , 102-Q in FIG. 1. As such, another approach to executing the instructions 220 in a manner transparent to the network devices communicating and exchanging the control plane messages includes employing a packet redirection protocol and/or technique, e.g., encapsulation and/or tunneling. Additionally, as yet another approach, executing the instructions 220 in a manner transparent to the network devices communicating and exchanging the control plane messages may include providing the instructions 220 as part of an embedded card in one or more recipient network devices, e.g., edge routers 102-1, 102-2, . . . , 102-Q in FIG. 1.

Hence, in at least one embodiment of the present disclosure the instructions 220 can be executed to intercept BGP updates and process associated cryptographic signatures before receipt by a BGP router. That is, a specific set of instructions associated with a cryptographic signatures module 220 may be executed by a processing resource 214 in a control plane message path of an AS network to perform a defined action of verifying a cryptographic signature and then forward a tag, e.g., compliant with BGPsec, on to an edge router 102-1, 102-2, . . . , 102-Q.

In this example, an edge router 102-1, 102-2, . . . , 102-Q includes a "BGP speaker" router that participates in BGP at the edge of an AS. As large AS may have many "BGP speakers" which coordinate to maintain a consistent set of routes. The BGP speakers in an AS maintain Transmission Control Protocol (TCP) connections to peers. And, the "control plane" contains traffic by BGP speakers that describes how packet traffic contained in a "data plane", e.g. payload, is routed. In some embodiments, the instructions associated with the cryptographic signature module 220 are only executed to intercept BGP update messages and process associated cryptographic information associated with a "BGP speaker", before propagating the unchanged, but tagged update forward to a BGP router. In this manner, legacy routers can be preserved without a cost to upgrade and/or a disruption to AS to AS communication.

However, as shown in FIG. 2, the machine readable medium 218 may further include a path policies module 222. The path policies module 222 may include instructions executable by the processing resource 214 to take advantage of available routing information and executed to implement path policies and perform operations on packets associated with the data plane, e.g., perform reverse path forward (RPF) checking. As one example, a network device executing the path policies module 222 instructions may operate as a centralized, e.g., local to a point-of-presence (PoP), decision point in a network for route selection in the AS/PoP. In this example, functionality can be provided in the form of hardware logic and/or computer executable instructions and applied to allow the network device to operate as a flow controller, using OpenFlow or other traffic flow control mechanism, e.g., PBR, PBS, Mobility, etc.

Additionally, as shown in FIG. 2, the machine readable medium 218 may further include a filtering module 224. The filtering module 224 may include instructions executable by the processing resource 214 to filter packet traffic, e.g., apply ACLs, etc. Embodiments are not limited to the examples listed above.

Figure 3:
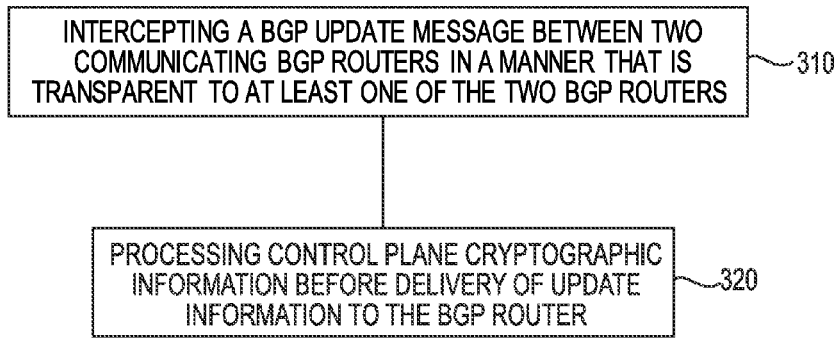
FIG. 3 provides a flow chart illustrating a computer implemented Border Gateway Protocol (BGP) method according to an embodiment of the present disclosure.

FIG. 3 provides a flow chart illustrating a computer implemented Border Gateway Protocol (BGP) method according to an embodiment of the present disclosure. That is, the example embodiment of FIG. 3 shows method for BGP update message intercepts according to an embodiment of the present disclosure. As shown at block 310 the method example embodiment of FIG. 3 includes executing computer readable instruction using a network device, e.g., 104-1, 104-2, . . . , 104-M, 104-W in FIG. 1, to intercept a BGP update message between two communicating BGP routers, e.g., 102-1 and 102-2, in a manner that is transparent to at least one of the two BGP routers. In at least one embodiment, the BGP update message is a BGPsec update message.

As shown as block 320 the method further includes processing control plane cryptographic information before delivery of update information to the at least one of the two BGP routers. In one example, the program instructions are executed to propagate the BGP update, unchanged, but tagged to the BGP router. In one or more embodiments, the instructions are executed to intercept BGP updates and process associated cryptographic signatures in a manner that is transparent to the network devices communicating and exchanging the control plane messages.

As described above, in at least one embodiment the method can include executing program instructions to intercept the BGP update message using an embedded card in the at least one of the two BGP routers. In another embodiment, the method can includes executing program instruction to intercept the BGP update message using by a network appliance, 104-1, 104-2, . . . , 104-M, 104-W inserted transparently in an AS network. Further, processing control plane cryptographic information can include verifying cryptographic signatures and forwarding tagged routes to the at least one of the two BGP routers such that the BGP router does not process the verified digital signature.

As such, at least one advantage to embodiments described herein is may be the ability to quickly and easily deploy the proposed BPGsec draft standard, currently in development, in existing AS networks without requiring upgrades to legacy routers and without creating data traffic disruption in such AS networks.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed is:

1. A network device to perform Border Gateway Protocol (BGP) intercepts, comprising:
    a processing resource; and
    a memory resource coupled to the processing resource, wherein the memory resource stores instructions executable by the processing resource to:
        intercept BGP security (BGPsec) updates from a BGP speaker in a first Autonomous System (AS) before receipt by a BGP speaker in a second AS;
        process associated cryptographic signatures, wherein processing the associated cryptographic signatures includes adding a tag to the BGPsec updates without adding a digital signature; and
        forward the tagged BGPsec updates without digital signatures to the BGP speaker in the second AS.

2. The device of claim 1, wherein the BGP speakers are AS edge routers, and wherein the program instructions are executed to intercept BGPsec updates in an operation that is transparent to the BGP speakers.

3. The device of claim 2, wherein the program instructions are executed to intercept Transmission Control Protocol (TCP) sessions in the operation that is transparent to the BGP speakers.

4. The device of claim 1, wherein the program instructions are executed to intercept only control plane traffic and then forward unchanged, but tagged updates to an intended destination address.

5. The device of claim 1, wherein device is positioned in a point of presence (PoP) in an autonomous system and the program instructions are executed to perform operations on both data plane traffic and control plane traffic.

6. A computer implemented Border Gateway Protocol (BGP) method, comprising:
   intercepting only BGP security (BGPsec) update messages between two communicating BGP routers in a manner that is transparent to at least one of the two BGP routers; and
   processing control plane cryptographic information before delivery of BGPsec update messages to the at least one of the two BGP routers;
      wherein processing control plane cryptographic information includes adding a tag to the BGPsec update messages, and
      forwarding the tagged, but unchanged, BGPsec update messages without cryptographic signatures to the at least one of the two BGP routers.

7. The method of claim 6, wherein intercepting the BGPsec update messages is performed by an embedded card in the at least one of the two BGP routers.

8. The method of claim 6, wherein intercepting the BGPsec update messages is performed by a network appliance.

9. The method of claim 6, wherein processing control plane cryptographic information includes:
   verifying cryptographic signatures; and
   forwarding tagged routes to an intended recipient BGP router of the at least one of the two BGP routers such that the recipient BGP router does not have to process cryptographic signatures.

10. A network for Border Gateway Protocol (BGP) intercept routing, comprising:
   a number of Autonomous Systems (ASes) communicating through BGP routers; and
   a network device to perform Border Gateway Protocol security (BGPsec) update intercepts, wherein the network device includes:
      a processing resource; and
      a memory resource coupled to the processing resource, wherein the memory resource stores program instructions executable by the processing resource to:
         intercept BGPsec control plane update messages received from a BGP router in a first AS before receipt by a BGP router in a second AS,
         verify cryptographic information, and
         forward a tagged, unchanged, BGPsec update message to the BGP router in the second AS.

11. The network of claim 10, wherein the network device is an embedded card in at least one of the BGP routers.

12. The network of claim 10, wherein at least one of the BGP routers includes program instructions executed by a processing resource to redirect packets to the network device.

13. The network of claim 10, wherein the network device is located at a point of presence (PoP) decision making location and serves as a flow controller using OpenFlow.

14. The network of claim 10, wherein the network device includes program instructions executed by the processing resource to intercept control plane and data plane information.

15. The network of claim 10, wherein the network device includes program instructions executed by the processing resource to take advantage of known routing information to:
   perform reverse path forward (RPF) checking; and
   filtering of packet traffic.

* * * * *